United States Patent [19]

Moll et al.

[11] 4,369,492

[45] Jan. 18, 1983

[54] DEVICE FOR THE PROTECTION OF A CONVERTER WHICH CONVERTS AN IMPRESSED D-C CURRENT FROM A CURRENT SOURCE INTO AN A-C CURRENT FED TO A LOAD

[75] Inventors: Klaus Moll, Frankenthal; Helmut Schulze, Ober-Ramstadt, both of Fed. Rep. of Germany

[73] Assignee: Brown, Boveri & Cie AG, Mannheim, Fed. Rep. of Germany

[21] Appl. No.: 244,123

[22] Filed: Mar. 16, 1981

[30] Foreign Application Priority Data

Mar. 18, 1980 [DE] Fed. Rep. of Germany ....... 3010338

[51] Int. Cl.³ .......................................... H02H 7/122
[52] U.S. Cl. ..................................... 363/58; 340/660; 363/138
[58] Field of Search .................. 363/51, 57, 58, 96, 363/137, 138; 318/801, 803; 340/660, 661

[56] References Cited

U.S. PATENT DOCUMENTS 3,821,630 6/1974 Kornrumpf et al. .................. 363/96
3,881,147 4/1975 Ueda et al. ............................ 363/57

FOREIGN PATENT DOCUMENTS 2756952 6/1979 Fed. Rep. of Germany ...... 363/137

Primary Examiner—William H. Beha, Jr.
Attorney, Agent, or Firm—Herbert L. Lerner; Laurence A. Greenberg

[57] ABSTRACT

The converter protection device has a number of controlled semiconductor elements. A control unit is connected to the semiconductor elements of the converter for forming firing pulses for the controlled semiconductor elements. Reference blocking intervals for the semiconductor elements are set and actual blocking intervals of the semiconductor elements are set and controlled. A comparator receives and compares the reference and actual blocking intervals. There are also provided a read-only memory for storing the reference blocking intervals, an event counter for counting disturbances detected by comparison of the reference and actual blocking intervals, a memory stage being connected to the event counter and being set if the event counter reaches a predetermined count, and a time-base device connected to the event counter and memory stage for resetting the event counter if the memory stage is not set at the end of a predetermined base time.

9 Claims, 3 Drawing Figures

DEVICE FOR THE PROTECTION OF A CONVERTER WHICH CONVERTS AN IMPRESSED D-C CURRENT FROM A CURRENT SOURCE INTO AN A-C CURRENT FED TO A LOAD

The invention relates to a device for the protection of a converter which converts an impressed d-c current generated in a current source into an a-c current and feeds it to a consumer, including a control unit in which firing pulses for the controlled semi-conductor elements of the converter are formed, a reference or desired-blocking interval setter, an actual-blocking interval controller, and a comparator which compares the desired and the actual blocking intervals of the controlled semiconductor elements with each other.

Such a protection device for a load-dependent thyristor inverter circuit is known from German Published Prosecuted Application No. DE-AS 26 09 578. The known arrangement contains a gated pulse oscillator which generates firing pulses for the inverter thyristor in a regular sequence. It further contains a voltage detector circuit which monitors the blocking voltage present at the thyristor as to whether the maximally permissible locking voltage level is exceeded. The reference conduction period transmitter is a monostable multivibrator which is triggered at the start of the firing pulses. A conduction period comparator compares the voltage at the inverter thyristor with the output signal of the monostable multi-vibrator. If the conduction period of the thyristor exceeds the pulse duration of the monostable multi-vibrator due to a commutation error, for instance, then a holding circuit is activated which suppresses the formation of the firing pulses. Should the permissible locking voltage be exceeded while the thyristor is cut off, the voltage detector circuit sees to it that the thyristor is switched into conduction and that a series-connected protection switch is simultaneously opened.

From German Published Non-Prosecuted Application No. DE-OS 23 23 826, a control device for a single or polyphase converter arrangement is known. This device includes one or more free-running, duty cycle control inverters, and contains an oscillator followed by a counter stage as well as a preprogrammed digital memory. Firing and extinguishing instants of the inverter arrangement, referred to the period of the fundamental at the inverter output, can be taken therefrom for predeterminable defined operating conditions in dependence on the arrival of such an operating state. These can be converted into time-dependent control signals for influencing the inverter arrangement. In this known control device, each period of the output a-c voltage is devided by means of the oscillator into a large number of time intervals. If the number of the instantaneous time interval agrees with the number of a time interval stored in the memory, a firing pulse is formed for a predetermined thyristor.

From German Published Non-Prosecuted Application No. DE-OS 27 56 952, a further control unit for a polyphase, free-running converter with impressed current is known. This device essentially includes a counter with eight address outputs, a resetting device, a memory, a decoding circuit, a digital comparator, at least four analog comparators combined into one unit, a frequency-to-voltage converter, six logic gates as well as six firing pulse stages. A pulse train is fed to the inputs of the counter and the frequency-voltage converter. The pulse train has a frequency which corresponds to an integral multiple of the output frequency of the converter. The outputs of the counter form the addresses of the momory. As soon as an information is stored in the memory at an instantaneously present address, the letter is read out. The stored information designates the thyristor to be addressed, it designates one of the timing procedures for the inverter stored in the memory, and optionally contains other signals for the operation of the inverter. At the same time analog voltage is formed in the frequency-voltage converter from the present pulse train. The four analog comparators following the converter form a binary word corresponding to the level of the voltage therefrom. This binary word is compared with four signals coming from the decoder circuit. Upon agreement, a release signal is generated which causes the firing pulses for the corresponding timing procedure to be passed to the thyristor in question.

In the practical operation of converters, disturbances are possible which, while they do not immediately lead to a response of the fuses connected in series with the converter, nevertheless result in a defect of individual semiconductor components, which only then causes the fuses to respond. Disturbances of this kind are, for instance, commutation errors or the response of emergency firing devices which are connected for the protection of the thyristors against overvoltage between the control electrode and the anode. Such firing of some thyristors does not stop the operation of the converter. However, it can lead to a thermal overload of the semiconductor components and to their destruction, particularly if the disturbance occurs periodically.

It is accordingly an object of the invention to provide a device for the protection of a converter, which overcomes the hereinaforementioned disadvantages of the heretofore-known devices of this general type, and which detects and evaluates such disturbances and is suitable particularly for free-running converters with an output frequency which can be set within limits, and with a multiplicity of semiconductor components.

With the foregoing and other objects in view there is provided, in accordance with the invention a device for the protection of a converter having a given number of controlled semiconductors elements or components, which converts an impressed d-c current generated in a current source into a-c current and feeds it to a load, comprising control means connected to the semiconductor elements of the converter for forming firing pulses for the controlled semiconductor elements, means for setting reference blocking intervals for the semiconductor elements, means for setting and controlling actual blocking intervals of the semiconductor elements, means connected to the reference and actual blocking interval setting means for comparing the reference and actual blocking intervals with each other, a read-only memory (ROM) for storing the reference blocking intervals, an event counter for counting disturbances detected by comparison of the reference and actual blocking intervals, a memory stage being connected to the event counter and being settable if the event counter reaches a predetermined count, and time-base means connected to the event counter and memory stage for always resetting the event counter if the memory stage is not set at the end of a predetermined base time.

In accordance with another feature of the invention, the actual blocking interval setting and controlling means includes a potential isolating stage with optical couplers and an evaluation circuit with comparators.

In accordance with a further feature of the invention, the comparing means includes a given number of AND gates equal to the given number of controlled semiconductor elements, the AND gates having inputs for receiving pulses corresponding to the actual and reference blocking intervals.

The information regarding the reference blocking intervals of the individual thyristors are made available by the control unit of the inverter where they are deposited, preferably in the same memory in which the information regarding the firing instant is also stored.

The actual blocking intervals of the individual thyristors are determined by a voltage evaluation device in accordance with the particular thyristor voltage waveform of the inverter with impressed current. For this purpose, as mentioned above, the actual blocking interval controller preferably contains an evaluation circuit with comparators and a potential isolation stage with optical couplers. The hysteresis of the comparators is preferably symmetrical to the zero line of the voltage at the thyristors.

In accordance with an added feature of the invention, the event counter has a clock or timing input and the AND gates have outputs, and there is provided an OR gate connected between the outputs of the AND gates and the clock input of the event counter. In this way all disturbances are picked up and summed regardless of the semiconductor component in which they occur.

In accordance with an additional feature of the invention, the event counter is a one-of-n-counter, and there is provided a first selector connected between the event counter and the memory stage. By means of the counter and the selector it is possible, in a simple manner, to generate an alarm or shut-off signal only if a predetermined number of disturbances which brings about the danger of thermal overloading of individual semiconductor elements is reached.

In accordance with again another feature of the invention, the memory stage is an RS flipflop. The RS flipflop is set by its S input as soon as the output of the event counter, which is set by the selector, is activated, and is reset via its R input as soon as an external reset signal is generated there.

In accordance with again a further feature of the invention, the event counter has a resetting input, and the time-base means includes a binary base counter having a clock input receiving regular clock pulses and a resetting input, a second counter selector connected to the binary base counter, and a time-delay member connected between the counter selector and the resetting inputs of the counters for supplying a resetting pulse of given length to the resetting input of the event counters. The formation of the time base from an adjustable number of clock pulses makes it possible to adapt the time base to the respective inverter to be protected in a simple manner.

In accordance with again an added feature of the invention, the time-delay member is a monoflop. The monoflop transforms the pulse of undefined length that is present at the output of the time base counter, into a resetting pulse of exactly defined length.

In accordance with again an additional feature of the invention, the time-delay member and memory stage have outputs, and there is provided an AND gate for blocking the resetting pulses for the event counter, the blocking AND gate having a first input connected to the output of the time-delay member, a second input connected to the output of the memory stage, and an output connected to the resetting input of the event counter. This AND gate blocks the passing of the resetting pulse only if the permissible number of disturbances was exceeded during the predetermined base time.

In accordance with a concomitant feature of the invention, the comparing means includes a given number of AND gates equal to the given number of controlled semiconductor elements, the AND gates having inputs for receiving pulses corresponding to the actual and reference blocking intervals and outputs, and there is provided a diagnostic device including a given number of memory states equal to the given number of controlled semiconductor elements, each of the memory states having setting inputs connected to the AND gate outputs, comparing the conduction periods resetting inputs connected to the output of the blocking AND gate delivering the resetting pulses, and outputs, and indicator elements connected to the outputs of the memory stages. This simple diagnostic device accurately indicates, through the activation of an indicator element, at which semiconductor element it was that disturbance had occurred. As long as the distrubances occurring during the base time do not exceed the maximally permissible number, the diagnostic device is reset together with the event counter.

Other features which are considered as characteristic for the invention are set forth in the appended claims.

Although the invention is illustrated and described herein as embodied in a device for the protection of a converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
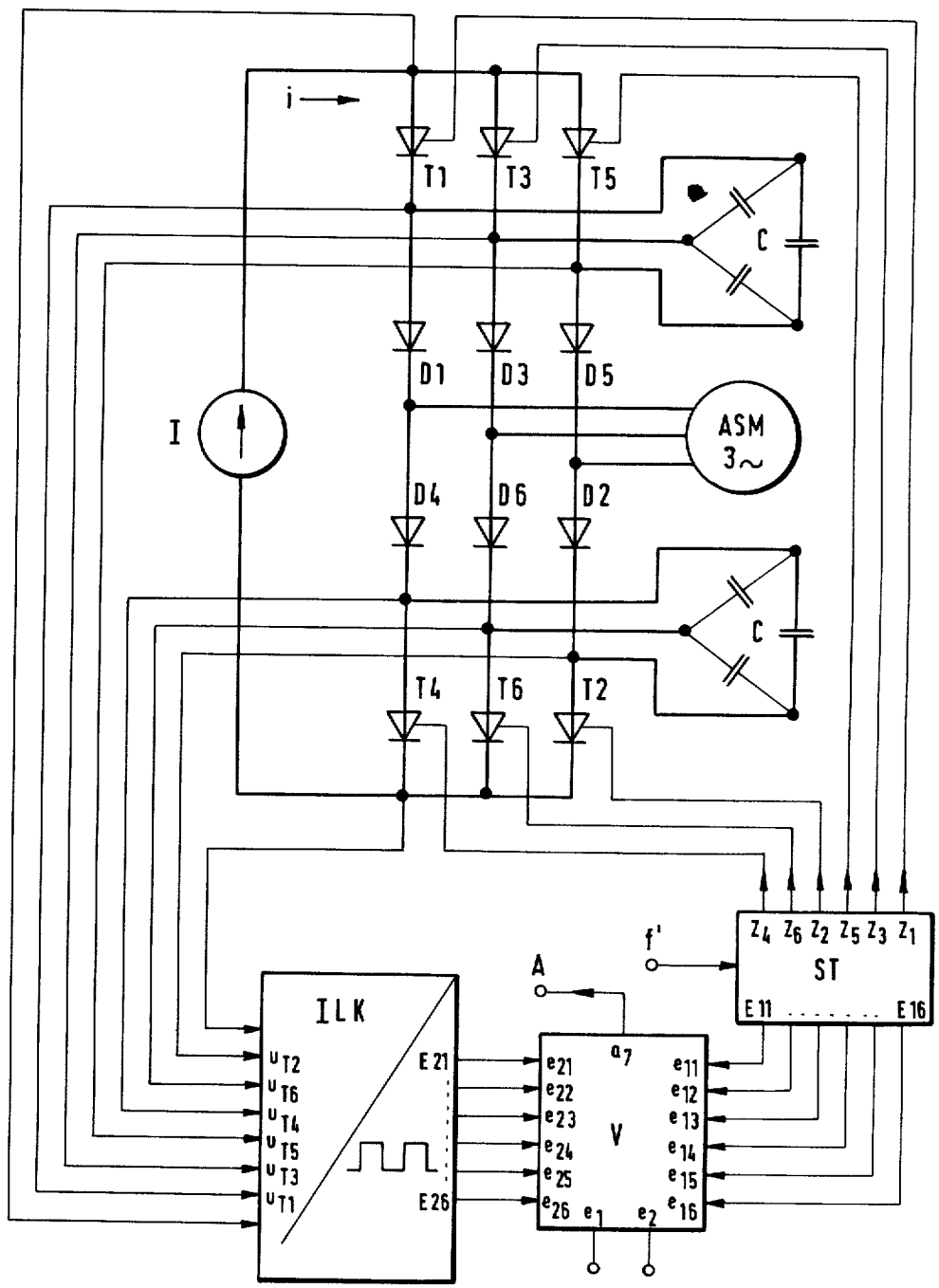
FIG. 1 is a schematic block circuit diagram of a three-phase inverter with phase sequence quenching including the device according to the invention.

Referring now to the figures of the drawing and first particularly to FIG. 1 thereof, there is seen a three-phase inverter with phase sequence quenching, including six thyristors T1 . . . T6, six diodes D1 . . . D6 and six commutating capacitors C, which feeds a three-phase asynchronous machine ASM as the load. The inverter itself is supplied from a d-c source I with impressed d-c current i. The firing pulses $Z_1 \ldots Z_6$ for the thyristors T1 . . . T6 are formed in a control unit ST, to which a signal f' for the frequency of the inverter output voltage is fed. The construction of such a three-phase inverter with phase sequence quenching is known, for instance, from the German Journal "ETZ-A", Volume 96 (1975), number 11, Page 520. The construction of a control unit which is suitable for use with the present invention is known, for instance from German Published Non-Prosecuted Application No. DE-OS 27 56 952.

In addition to the firing pulses $Z_1 \ldots Z_6$, the control unit ST also delivers pulses E11 ... E16, which correspond to the reference blocking intervals of the thyristors T1 ... T6. These pulses E11 ... E16 are fed to inputs e11 ... e16 of a comparator V.

The voltages $U_{T1} \ldots U_{T6}$ at the thyristors T1 ... T6 are present at the input of the actual blocking interval controller ILK. At the controller ILK the voltages are brought to the potential of the electronic circuitry through a potential-isolating stage with optical couplers. By means of comparators having a hysteresis which is preferably symmetrical to the zero line of the voltage, square wave pulses are formed therefrom, which correspond to the actual blocking intervals E2 of the thyristors T1 ... T6. The individual pulse trains E21 ... E26 are present at the inputs e21 ... e26 of the comparator V. In the event of a disturbance, an alarm or shutoff signal A appears at the output a7 of the comparator V.

An external resetting signal at the input e1 and clock pulses for a time-base stage at the input e2, are additionally fed to the comparator V.

Figure 2:
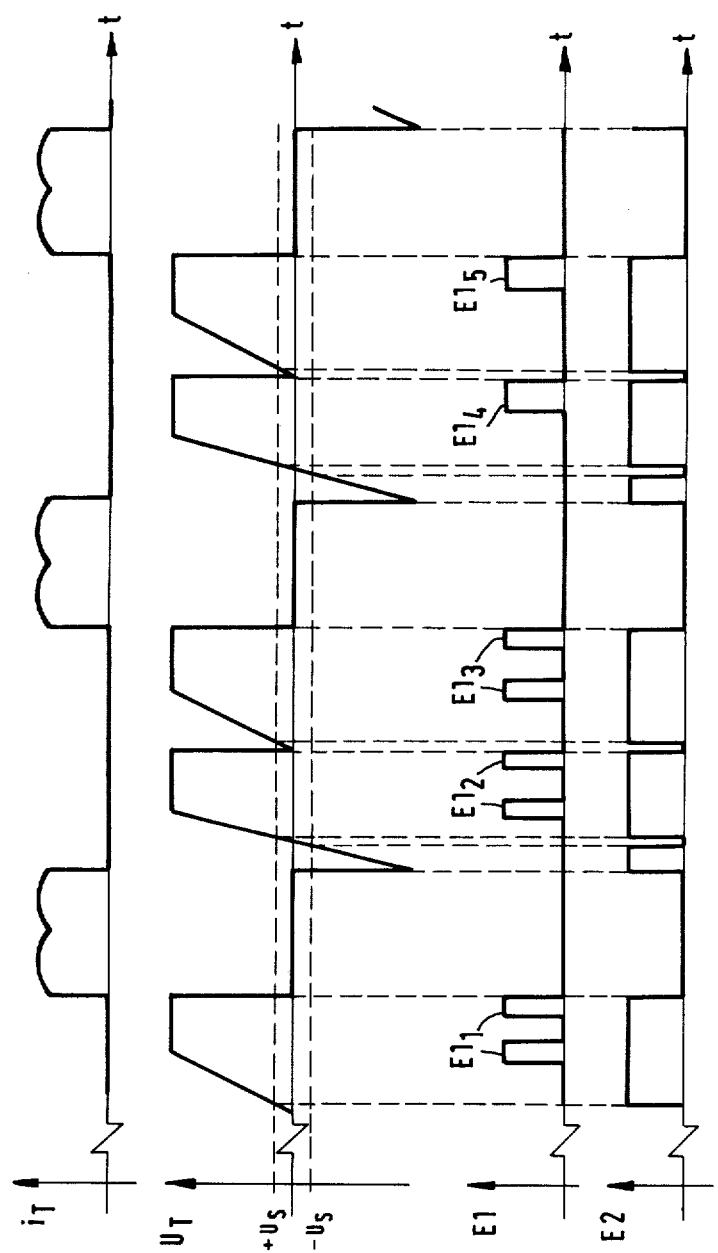
FIG. 2 is a graph showing the wave forms of the thyristor current, the thyristor voltage, reference conduction periods, and actual conduction periods as a function of time.

FIG. 2 graphically illustrates the typical waveform of the current $i_T$ through one of the thyristors of the phase sequence-control inverter with impressed current. Further seen is the typical waveform of the voltage of the voltage $U_T$ at this thyristor. It is seen that during current conduction, the voltage at the thyristor is zero or almost zero. Also shown is the positive and negative threshold voltage $U_S$ of the comparators used in the actual blocking interval controller ILK.

The pulse series $E1_1 \ldots E1_5$ indicates the reference blocking interval; if the reference blocking interval E1 is different from or not at zero, the actual blocking interval E2 which is shown below, must always also be different from zero. The actual blocking interval pulse train E2 is always different from zero if the thyristor voltage $U_T$ is larger than the threshold voltage $U_S$.

Figure 3:
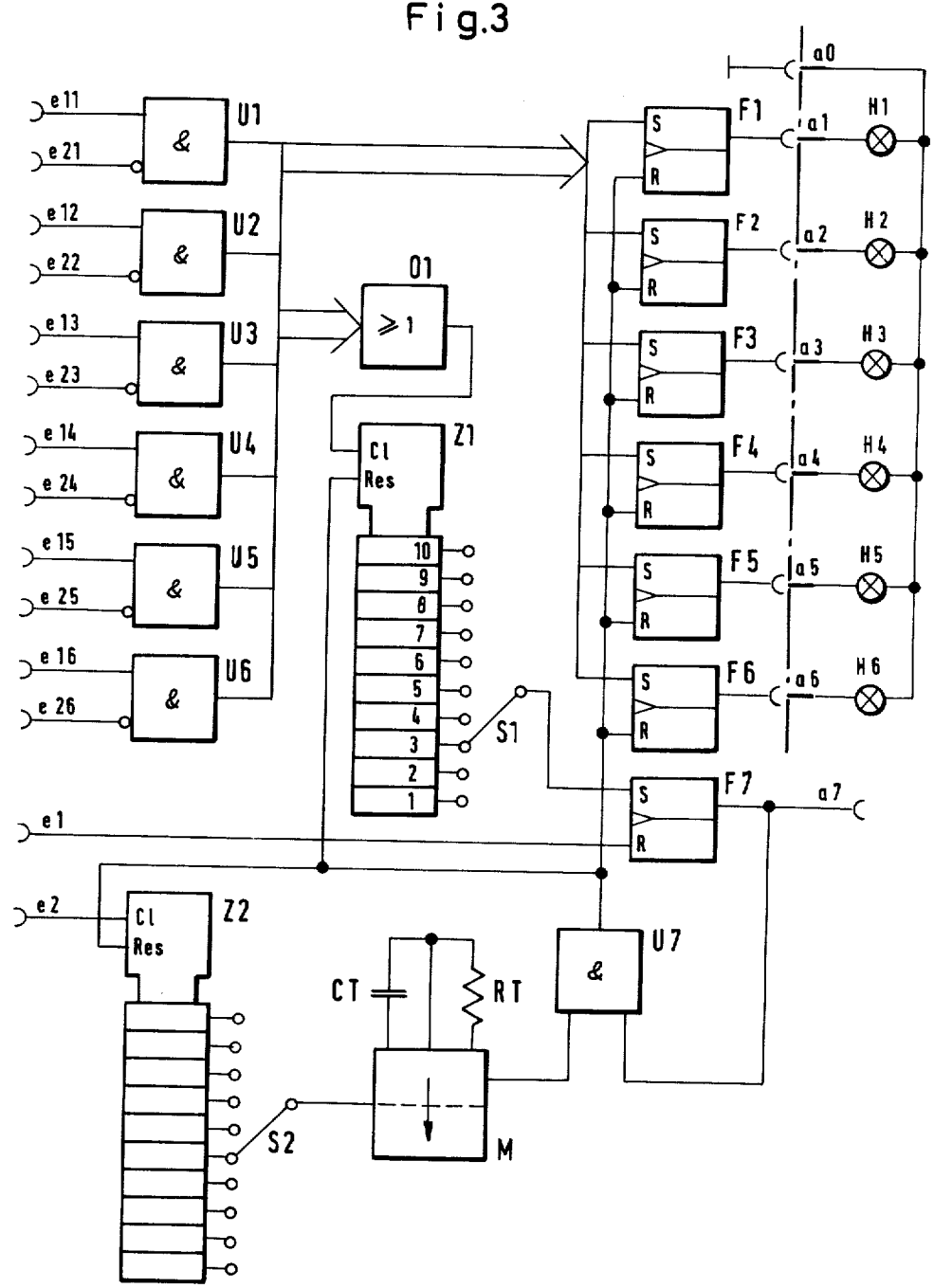
FIG. 3 is a schematic block circuit diagram of the comparator device with an additional diagnostic device.

FIG. 3 shows a construction of the comparator V of FIG. 1. The six inputs e11 ... e16 and e21 ... e26 which are seen are each brought to an AND gate U1 ... U6. All outputs of the AND gates U1 ... U6 are brought through an OR gate 01 to the clock input C1 of an event counter Z1. The event counter Z1 is constructed as a 1-of-10-counter. Ten outputs 1–10 of counter Z1 are connected through a first selector S1 to the setting input S of an RS flipflop F7 serving as a memory. As soon as the event counter Z1 has summed up the set number of disturbances, the alarm signal A appears at the output a7 of the comparator V.

The clock pulses present at the input e2, are fed to the clock input C1 of a time-base counter Z2 constructed as a binary counter. The output signals of the time-base counter Z2 are connected through a second selector S2 to a time-delay stage M. The time-delay stage M is a monoflop, the output pulse of which is set to a fixed value through a resistor RT and a capacitor CT. The output of the time-delay member is fed to a first input of an AND gate U7. The output of the flipflop F7 is present at the second input of the AND gate U7 which is constructed as a blocking input. As long as no alarm or shut-off signal A is present at the output of the flipflop F7, the resetting pulses from the time-delay member M are conducted through the AND gate U7 to the resetting input Res of the event counter Z1 as well as to the resetting input Res of the time base counter Z2. Therefore, both counters are reset to zero and the hereinafore-described process starts anew. The combination of the time-base counter Z2, second selector S2 and time delay stage M form a time-base device.

In FIG. 3 there are further seen a diagnostic device which includes six RS flipflops F1 ... F6, the setting inputs S of which are each connected to an output of the AND gates U1 ... U6 comparing the reference and actual blocking intervals. The resetting inputs R of all flipflops F1 ... F6 are connected together to the output of the AND gate U7. Indicator lamps H1 ... H6 are connected to the outputs a1 ... a6 of all flipflops F1 ... F6. The second lead of each lamp is connected to ground at the terminal a0 through a common line. As soon as a signal indicating a disturbance appears at one of the AND gates F1 ... F6 comparing the pulses, the corresponding flipflop F1 ... F6 is set and the corresponding indicator lamp H1 ... H6 lights up. Should the maximally permissible number of disturbances not be exceeded within the base time, the flipflops F1 ... F6 are jointly reset and the indicator lamps are extinguished.

There are claimed:

1. Device for the protection of a converter having a given number of controlled semiconductor elements, which converts an impressed d-c current generated in a current source into a-c current and feeds it to a load, comprising control means connected to the semiconductor elements of the converter for forming firing pulses for the controlled semiconductor elements, means for setting reference blocking intervals for the semiconductor elements, means for setting and controlling actual blocking intervals of the semiconductor elements, means connected to said reference and actual blocking interval setting means for comparing said reference and actual blocking intervals with each other, a read-only memory for storing said reference blocking intervals, an event counter for counting disturbances detected by comparison of said reference and actual blocking intervals, a memory stage being connected to said event counter and being settable if said event counter reaches a predetermined count, and time-base means connected to said event counter and memory stage for resetting said event counter if said memory stage is not set at the end of a predetermined base time.

2. Device according to claim 1, wherein said comparing means includes a given number of AND gates equal to said given number of controlled semiconductor elements, said AND gates having inputs for receiving pulses corresponding to said actual and reference blocking intervals.

3. Device according to claim 2, wherein said event counter has a clock input and said AND gates have outputs, and including an OR gate connected between said outputs of said AND gates and said clock input of said event counter.

4. Device according to claim 1, wherein said event counter is a one-of-n-counter, and including a selector connected between said event counter and said memory stage.

5. Device according to claim 1 or 4, wherein said memory stage in an RS flipflop.

6. Device according to claim 1, wherein said event counter has a resetting input, and said time-base means includes a binary base counter having a clock input receiving regular clock pulses and a resetting input, a counter selector connected to said binary base counter, and a time-delay member connected between said counter selector and said resetting inputs of said counters for supplying a resetting pulse of given length to said resetting inputs of said counters.

7. Device according to claim 6, wherein said time-delay member is a monoflop.

8. Device according to claim 6, wherein said time-delay member and memory stage have outputs, and including an AND gate for blocking said resetting pulses for said event counter, said blocking AND gate having a first input connected to said output of said time-delay member, a second input connected to said output of said memory stage, and an output connected to said resetting input of said event counter.

9. Device according to claim 8, wherein said comparing means includes a given number of AND gates equal to said given number of controlled semiconductor elements, said AND gates having inputs for receiving pulses corresponding to said actual and reference blocking intervals and outputs, and including a diagnostic device including a given number of memory stages equal to said given number of controlled semiconductor elements, each of said memory stages having setting inputs connected to said AND gate outputs, comparing the conduction periods resetting inputs connected to said output of said blocking AND gate delivering said resetting pulses, and outputs, and indicator elements connected to said outputs of said memory stages.

* * * * *